United States Patent
Benoit-Gonin et al.

(10) Patent No.: US 11,097,457 B2
(45) Date of Patent: Aug. 24, 2021

(54) METHOD OF FORMING A CLOSURE

(71) Applicant: OBRIST CLOSURES SWITZERLAND GMBH, Reinach (CH)

(72) Inventors: Claude Benoit-Gonin, Odenas (FR); Philippe Bardet, Gleize (FR)

(73) Assignee: Obrist Closures Switzerland GmbH, Reinach (CH)

( * ) Notice: Subject to any disclaimer, the term of this patent is extended or adjusted under 35 U.S.C. 154(b) by 299 days.

(21) Appl. No.: 15/549,045

(22) PCT Filed: Sep. 3, 2015

(86) PCT No.: PCT/EP2015/070164
§ 371 (c)(1),
(2) Date: Aug. 4, 2017

(87) PCT Pub. No.: WO2016/124260
PCT Pub. Date: Aug. 11, 2016

(65) Prior Publication Data
US 2018/0009142 A1   Jan. 11, 2018

(30) Foreign Application Priority Data

Feb. 5, 2015 (GB) .................................. 1501940

(51) Int. Cl.
*B29C 45/16* (2006.01)
*B65D 41/34* (2006.01)
(Continued)

(52) U.S. Cl.
CPC ...... *B29C 45/1675* (2013.01); *B29C 33/0038* (2013.01); *B29C 45/0001* (2013.01);
(Continued)

(58) Field of Classification Search
None
See application file for complete search history.

(56) References Cited

U.S. PATENT DOCUMENTS 2,074,830 A * 3/1937 Conner .............. B65D 41/0492
215/329
2,394,135 A * 2/1946 Baar ............................. 215/303
(Continued)

FOREIGN PATENT DOCUMENTS

EP        0779225 A1   6/1997
EP        1645519 A1   4/2006
(Continued)

OTHER PUBLICATIONS

Dec. 4, 2015. (PCT). International Search Report for PCT/EP2015/070164.
(Continued)

*Primary Examiner* — Edmund H Lee
(74) *Attorney, Agent, or Firm* — Banner & Witcoff, Ltd.

(57) ABSTRACT

A method of forming a bi-injected closure, comprising the steps of: forming a cap with a top plate and a depending sidewall, in a first injection moulding phase using a first mould part, the cap formed so as to include one or more external sealing areas; changing the first mould part for a second mould part, the second mould part sealing against the or each sealing area on the cap; and forming an outer ring around the cap sidewall whilst the second mould part is sealed against the sealing area/s in a second moulding phase.

20 Claims, 9 Drawing Sheets (51) Int. Cl.
  *B29C 33/00* (2006.01)
  *B65D 41/04* (2006.01)
  *B29C 45/00* (2006.01)
  *B29L 31/56* (2006.01)
  *B29K 21/00* (2006.01)

(52) U.S. Cl.
  CPC ...... *B29C 45/1676* (2013.01); *B65D 41/0421* (2013.01); *B65D 41/3428* (2013.01); *B29C 2045/1623* (2013.01); *B29C 2045/1687* (2013.01); *B29K 2021/003* (2013.01); *B29K 2023/06* (2013.01); *B29L 2031/56* (2013.01); *B29L 2031/565* (2013.01)

(56) References Cited

U.S. PATENT DOCUMENTS

| | | | |
|---|---|---|---|
| 4,657,153 A | 4/1987 | Hayes | |
| 6,481,589 B2* | 11/2002 | Blomdahl | B65D 41/0485 215/303 |
| 7,007,817 B2* | 3/2006 | Jochem | B29C 37/0085 215/305 |
| 7,097,790 B2* | 8/2006 | Jochem | B29C 37/0085 264/148 |
| 7,150,845 B1* | 12/2006 | Gram | B29C 45/045 264/254 |
| 7,887,731 B2* | 2/2011 | Schmeisser | B29C 45/16 264/255 |
| 8,109,396 B1* | 2/2012 | Robinson | B65D 50/041 215/220 |
| 10,265,897 B2* | 4/2019 | Gehringer | B29C 45/1676 |
| 2002/0113032 A1* | 8/2002 | Blomdahl | B65D 41/0485 215/341 |
| 2004/0011759 A1 | 1/2004 | Hahn | |
| 2005/0145593 A1* | 7/2005 | Simone | B65D 41/0485 215/295 |
| 2008/0011703 A1 | 1/2008 | Schmeisser | |
| 2008/0073312 A1 | 3/2008 | Babcock et al. | |
| 2008/0302753 A1* | 12/2008 | Jochem | B65D 41/0485 215/228 |

FOREIGN PATENT DOCUMENTS

| | | |
|---|---|---|
| EP | 2075195 A1 | 7/2009 |
| EP | 2700589 A2 | 2/2014 |
| FR | 2752560 A1 | 2/1998 |
| GB | 2022063 A | 12/1979 |
| WO | 200168468 A1 | 9/2001 |
| WO | 2014101973 A1 | 7/2014 |

OTHER PUBLICATIONS

Aug. 10, 2015. Great Britain Intellectual Property Office Search Report on GB1501940.9.
Jul. 28, 2020—(EP) Office Action—App 15770822.3.

* cited by examiner

METHOD OF FORMING A CLOSURE

The application is a U.S. National Phase Entry of International Application No. PCT/EP2015/070164, filed on Sep. 3, 2015, designating the United States of America and claiming priority to British Patent Application No. 1501940.9, filed on Feb. 5, 2015, and the present application claims priority to and the benefit of all of the above-identified applications, which are incorporated by reference herein in their entirety.

The present invention relates generally to a closure and particularly to a method of forming a moulded closure.

The present invention seeks to provide improvements in or relating to a bi-injection moulding process.

According to an aspect of the present invention there is provided a method of forming a bi-injected closure, comprising the steps of: forming a cap with a top plate and a depending sidewall in a first injection moulding phase using a first mould part, the cap formed so as to include one or more external sealing areas; changing the first mould part for a second mould part, the second mould part sealing against the or each sealing area on the cap; and forming an outer ring around the cap sidewall whilst the second mould part is sealed against the sealing area/s in a second moulding phase.

The cap may have a plurality of sealing areas, for example two sealing areas.

The sealing areas may delimit a cavity for the ring in the second moulding phase.

One or more sealing areas may be formed on the cap sidewall. For example the sealing areas may flank that portion of the sidewall onto which the ring is formed.

The sealing area may be generally flat, or an angle, or a chamfer, or a radius.

The or each sealing area may be a width in the range 0.1 mm to 0.3 mm.

The closure may be demoulded along the main axis thereof. A natural demoulding may be used.

In the first moulding phase the material may be injected generally axially (with respect to the cap), for example into the mould cavity region which will form the cap top plate.

In the second moulding phase the material may be injected generally laterally (with respect to the cap), for example into the mould cavity region which will form the ring.

Part of the mould may be rotated between the first and second phases. For example the cap, carried on a core mould part, may be rotated. The mould may be rotated approximately 90 degrees.

The cap sidewall may be formed so as to include one or more anti-rotation ribs on its exterior.

The ring may be formed so as to include one or more ribs on its exterior.

The cap may formed from a suitable injection mouldable material, such as polyethylene.

The ring may be formed from a flexible material; for example a thermoplastic elastomer.

A further aspect provides a method of forming a bi-injected closure comprising the steps of: injection moulding a cap using a mould including a first superior mould part; opening the mould; providing a second superior mould part; closing the second superior mould part onto the cap; delimiting a cavity into which material is to be injected into the second superior mould part using spaced sealing zones on the cap; and injection moulding an outer ring around the cap.

According to a further aspect of the present invention there is provided a method of forming a bi-injected closure, comprising the steps of: a first injection moulding phase to form a cap with a top plate and a depending sidewall; and a second injection moulding phase to form a ring around the sidewall, in which in the first phase material is injected generally axially and in the second phase material is injected generally laterally.

The first and second moulding phases may be performed using a rotary tool and the tool may be rotated after the first phase.

The first phase injection may be generally axially into the top plate region of the mould cavity. The injection may be generally central into the top plate mould cavity region.

Corresponding formations may be formed on the outer surface of the sidewall and the inner surface of the ring to promote bonding of the first and second phase materials.

The first and second phase materials may be generally the same. Alternatively the first and second phase materials may be different.

The first and/or second phase material may be a polyolefin, such as polyethylene.

In some embodiments the first phase material may be generally rigid once cured and the second phase material may be generally flexible once cured.

The injection point for the second phase material into the sidewall cavity region may be: at or towards one end or the region; or spaced from the region ends.

Once formed in phase 1, the cap may include one or more support points upon which a changed mould part is supported during the second phase.

In one embodiment the present invention comprises:
  bi-injection moulding of two parts: e.g. a cap (part 1) and a ring (part 2);
  the cap has two support areas;
  the support areas mean that in the second stage of moulding, when the mould change part is closed onto the cap there is a good seal of the metal mould part against the plastic cap;
  the material for the ring is injected into a cavity between the two support areas;
  the cap is demoulded naturally and this allows formation of anti-rotation ribs on the outside of the cap; and
  the ring is demoulded naturally and this allows formation of ribs on the outside of the ring.

The present invention also provides a method of sequentially moulding a container closure, comprising the steps of: a first injection stage in a mould having inner and outer mould parts to form an inner cap; opening the mould by removing the outer mould part; retaining the inner cap on the inner mould part and rotating them; reclosing the mould with a changed outer mould part; and a second injection stage to form an out ring around the sidewall.

The present invention also provides a method substantially as shown and/or described herein.

The present invention also provides a closure formed by a method as described herein.

The present invention also provides a method of forming a bi-injected closure, comprising the steps of: forming a first part in a first injection moulding phase using a first mould part, the first part formed so as to include one or more external sealing areas; changing the first mould part for a second mould part, the second mould part sealing against the or each sealing area;

forming a second part onto the first part whilst the second mould part is sealed against the sealing area/s in a second moulding phase.

The present invention also provides a closure substantially as shown and/or described herein.

In some embodiment the present invention relates to a mould for the overmoulding of a material on another.

The shape of the first moulded portion may be equipped with two specific forms to prevent smudging and have a good steel/plastic closure.

Natural demoulding of the first part may be used to allow anti-rotation ribs between the two parts.

The workpiece may, for example, be round or oval.

Different aspects and embodiments of the invention may be used separately or together.

The present invention is more particularly shown and described, by way of example, with reference to the accompanying drawings, in which.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 1:
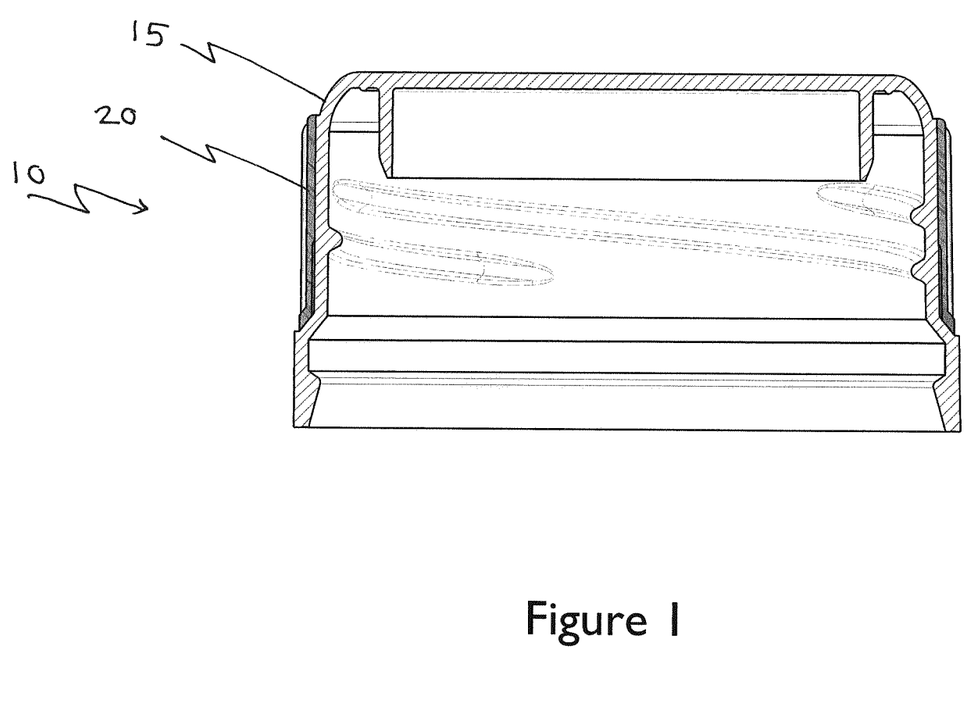
FIG. 1 is a section of a closure formed in accordance with the present invention.

Referring first to FIG. 1 there is shown a closure generally indicated 10. The closure 10 comprises an inner closure 15 and an outer ring 20.

Figure 2A:
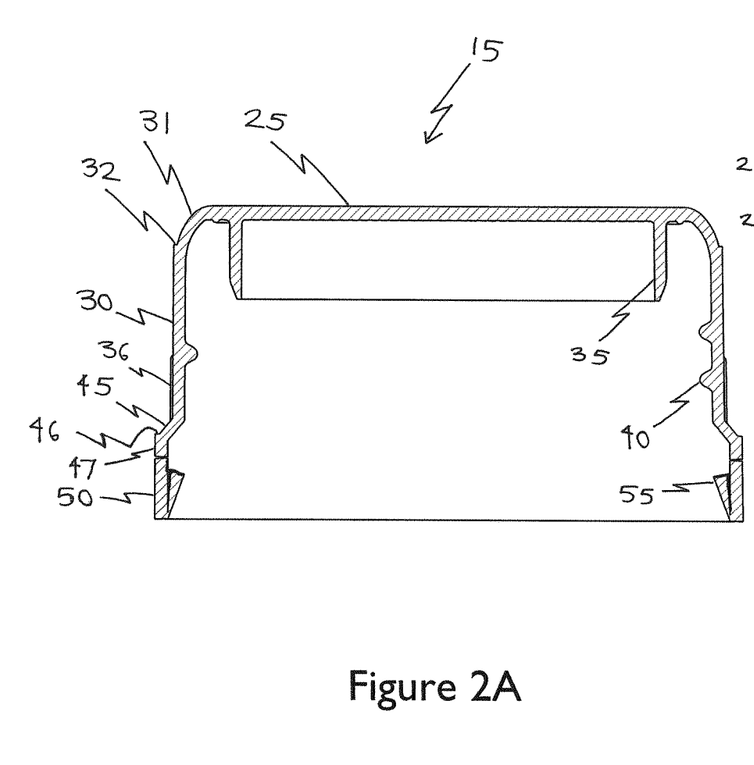
FIG. 2A is a section of the inner cap part of the closure of FIG. 1.

The inner cap 15, also shown in FIG. 2A, comprises a generally disc-shape top plate 25 and a generally cylindrical sidewall 30 which depends from the periphery of the top plate 25.

An internal annular sealing projection 35 depends from the underside of the top plate 25 and the inner surface of the sidewall 30 is provided with internal screwthread formations 40. The exterior of the sidewall is provided with a plurality of circumferentially spaced axial anti-rotation ribs 36

At the end of the sidewall opposite the top plate 25, an inclined wall section 45 is provided and extends radially outwardly.

At the end of the wall section 45 an axial wall section 47 depends and defines a radial, flat step 46.

The section 47 merges into an annular tamper-evident band 50 which is provided with an annular bead 55 on its interior surface.

At the top of the sidewall a curved intermediate wall section 31 extends and merges into the top plate 25. At the intersection of the wall section 31 and the sidewall a flat radial section 32 is defined.

Figure 2B:
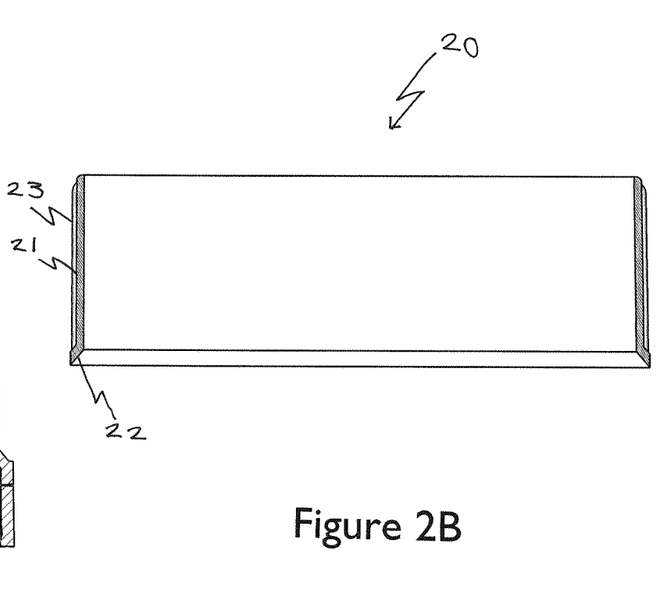
FIG. 2B is a section of the ring part of the closure of FIG. 1.

The ring 20 is generally annular with a main annular sidewall section 21 which at one end has an inclined terminus 22 shaped to correspond to the sidewall step 45. The exterior surface of the section 21 is provided with a plurality of axial ribs 23 and on the interior of the ring a plurality of grooves 24 are formed at the end closest to the terminus 21 corresponding to the ribs 36.

Figure 3:
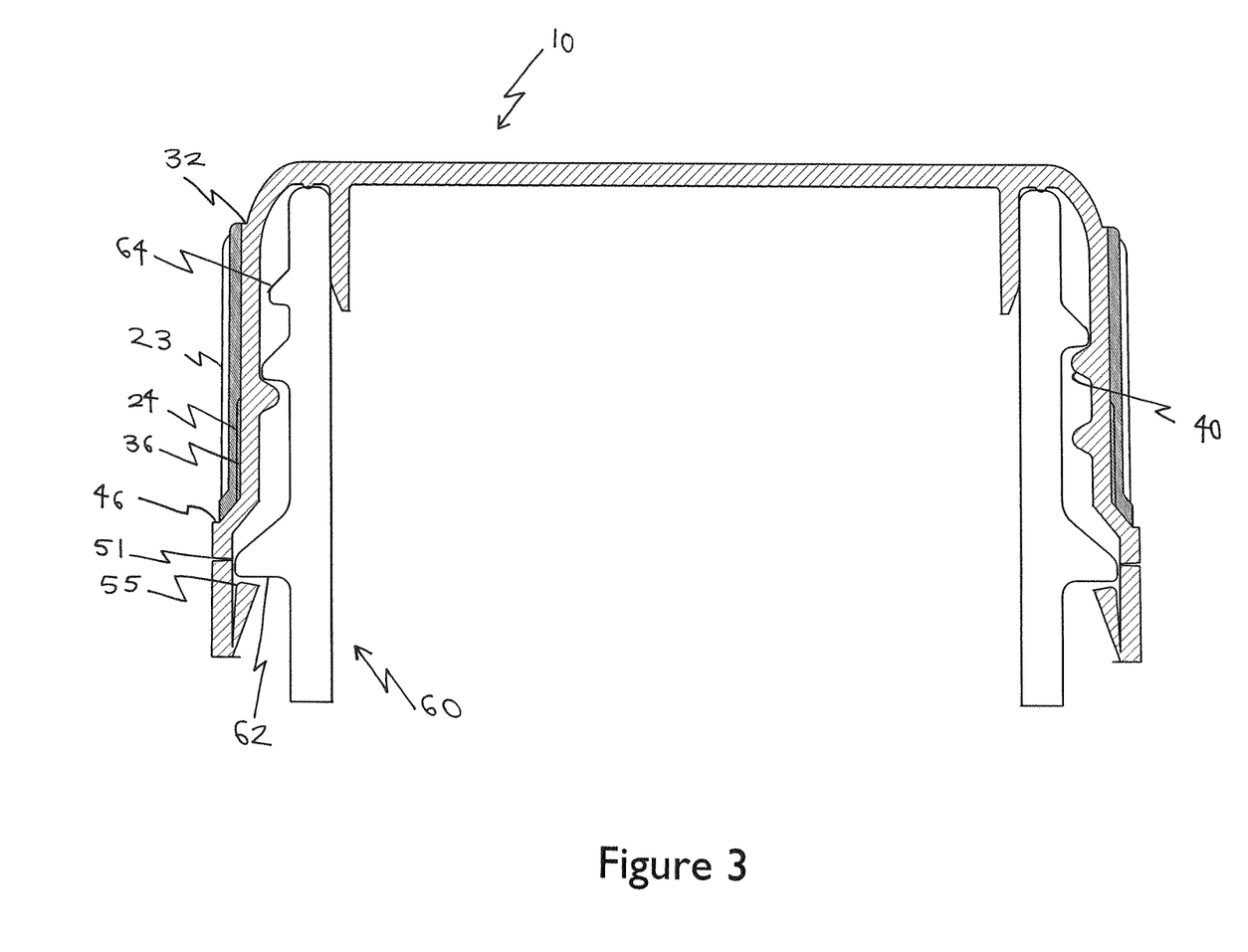
FIG. 3 is a section of the closure of FIG. 1 shown fitted to a container neck.

As shown in FIG. 3, in use the closure 10 is fitted to a container neck 60 by screwthread engagement between the sidewall threads 40 and corresponding thread 64 on the neck. The inner ceiling skirt 35 fits into the bore of the neck 60 to form a ceil against its interior surface and the bead 55 passes under a neck transfer bead 62 so that upon first opening when the closure is unscrewed the tamper-evident band 50 remains on the neck finish and is released from the sidewall step 45, for which purpose a plurality of frangible bridges 51 interspersed and defined by slits.

FIGS. 4 to 8 illustrate a method according to the present invention by which a closure of the type shown in FIGS. 1 to 3 could be manufactured.

Figure 4:
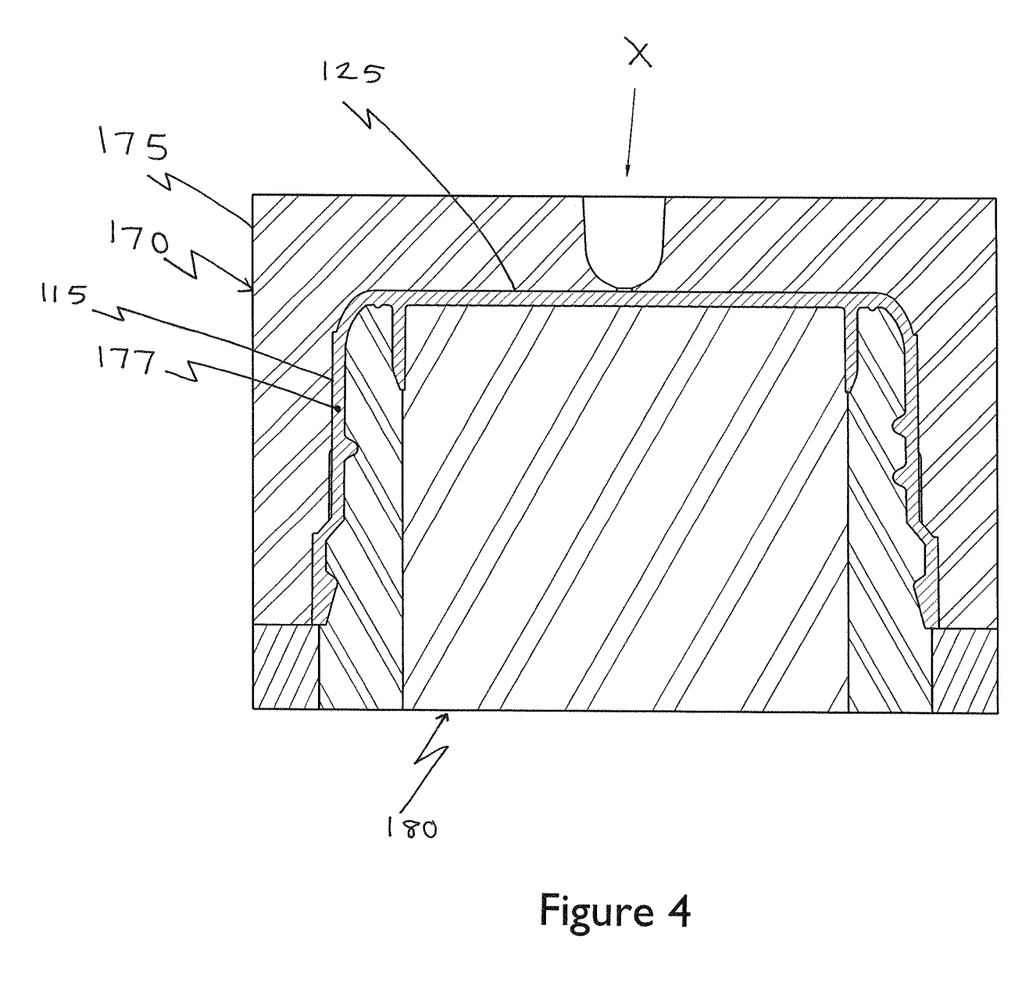
FIGS. 4 to 8 illustrate the steps in a method according to the present invention.
Figure 5:
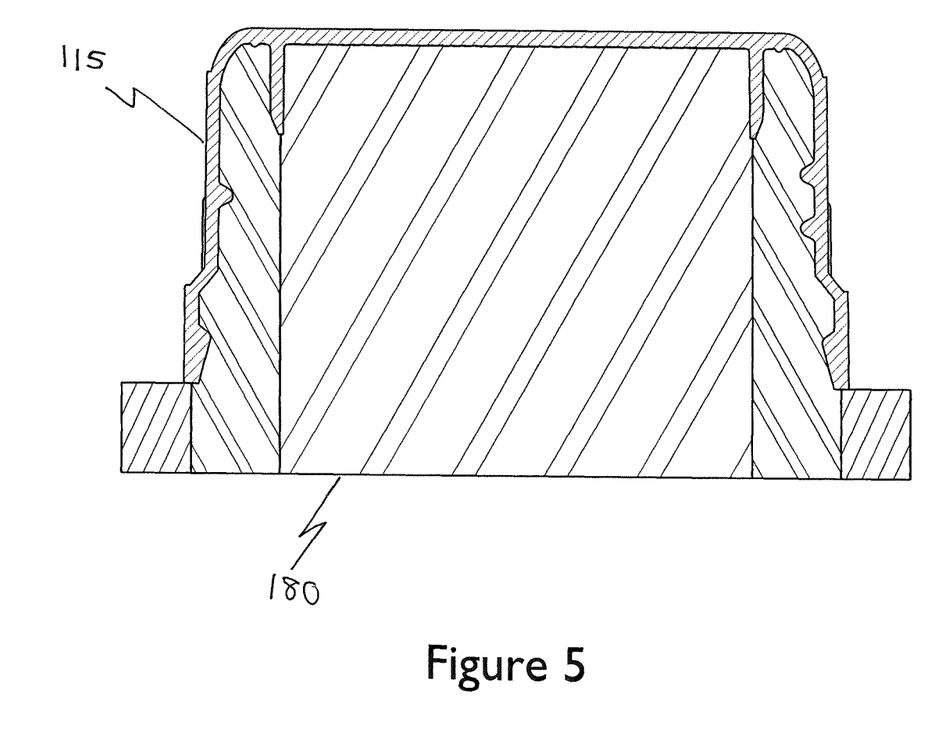

In FIG. 4 a mould generally indicated 170 is shown in a closed position a female or upper mould part 175 is closed onto an inner core 180 to define a mould cavity 177 corresponding to the inner cap 115. A plastics material, in this embodiment polyethylene, is injected into the mould in an axial direction X, in this embodiment with the gate generally in the centre of what will become the top plate 125.

Figure 6A:
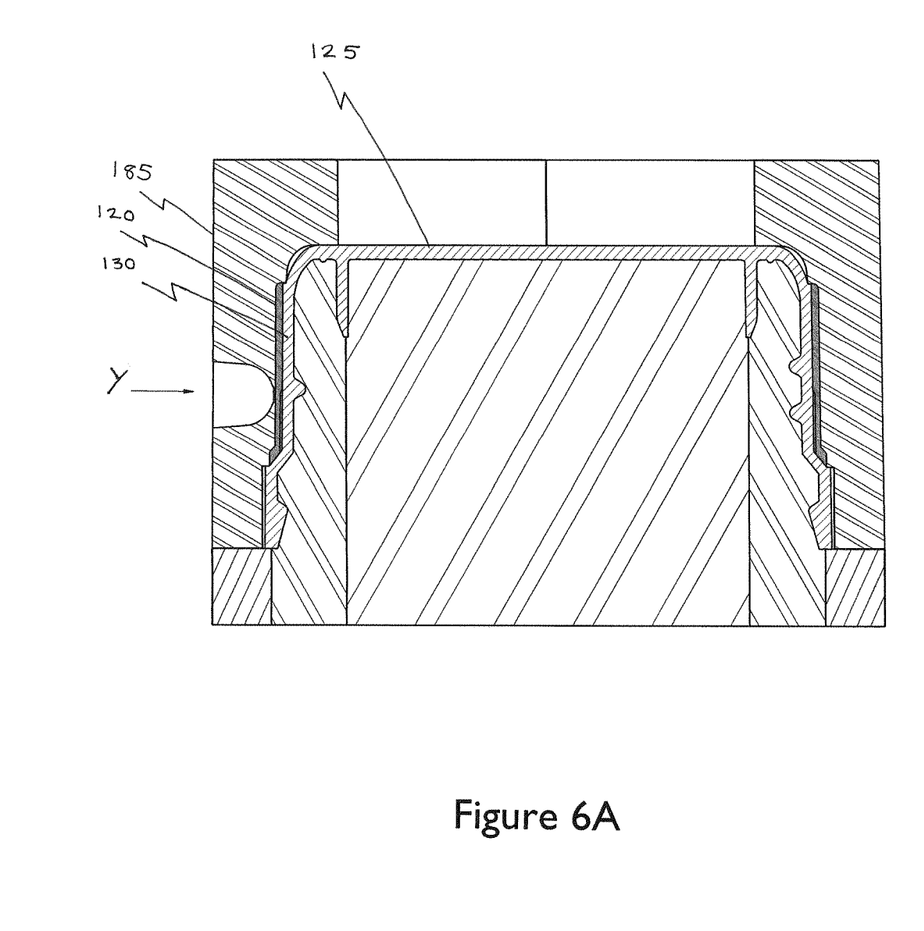

In FIG. 6 the mould has been opened. The newly formed inner cap 115 remains on the core 180 whilst the mould part 175 is withdrawn axially. The mould is then rotated, for example 90 degrees, and a new female mould part 185 is closed onto the inner cap, as shown in FIG. 6A.

The cavity into which the second material is injected is delimited by two closure zones A, B. The mould part closes onto the closure in the closure zones; there is direct compression on the inner cap.

Figure 6B:
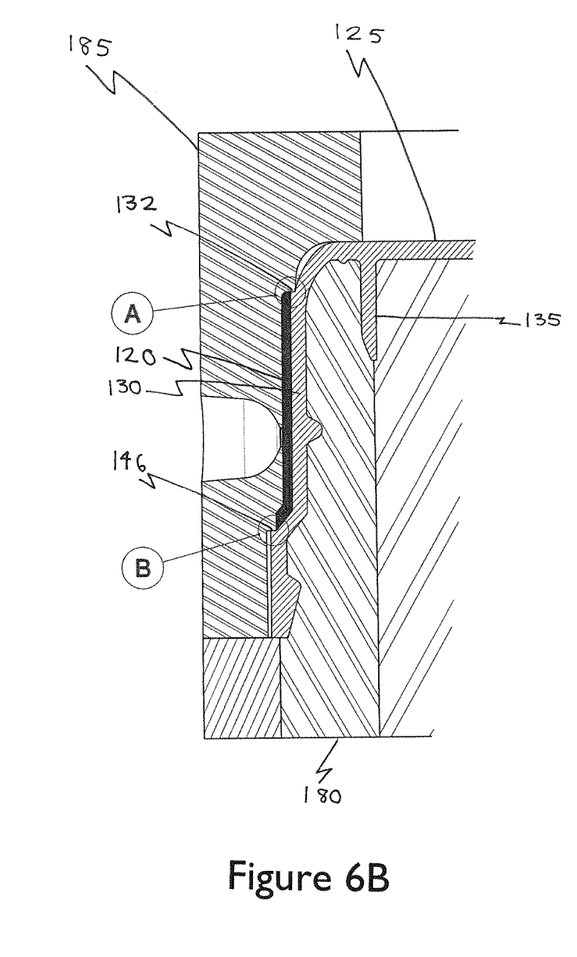

In this position the mould part 185 is partly supported by sealing areas A and B shown in FIG. 6B. The mould part 185 is supported principally at zones A and B. The metal mould part 185 seals against the cap steps 132, 146. The steps 132, 146 help to delimit the cavity into which material flows to form the ring 120.

With the mould in the closed position shown in FIGS. 6A and 6B the material for the bi-injected ring 120 is now introduced in a lateral direction Y by a lateral nozzle.

The outer ridges 136 on the cap sidewall are shown and it can be seen that the material of the ring flows around the ridges 136 to form the correspondingly shaped grooves 124 which help to promote bonding between the two materials.

Figure 7:
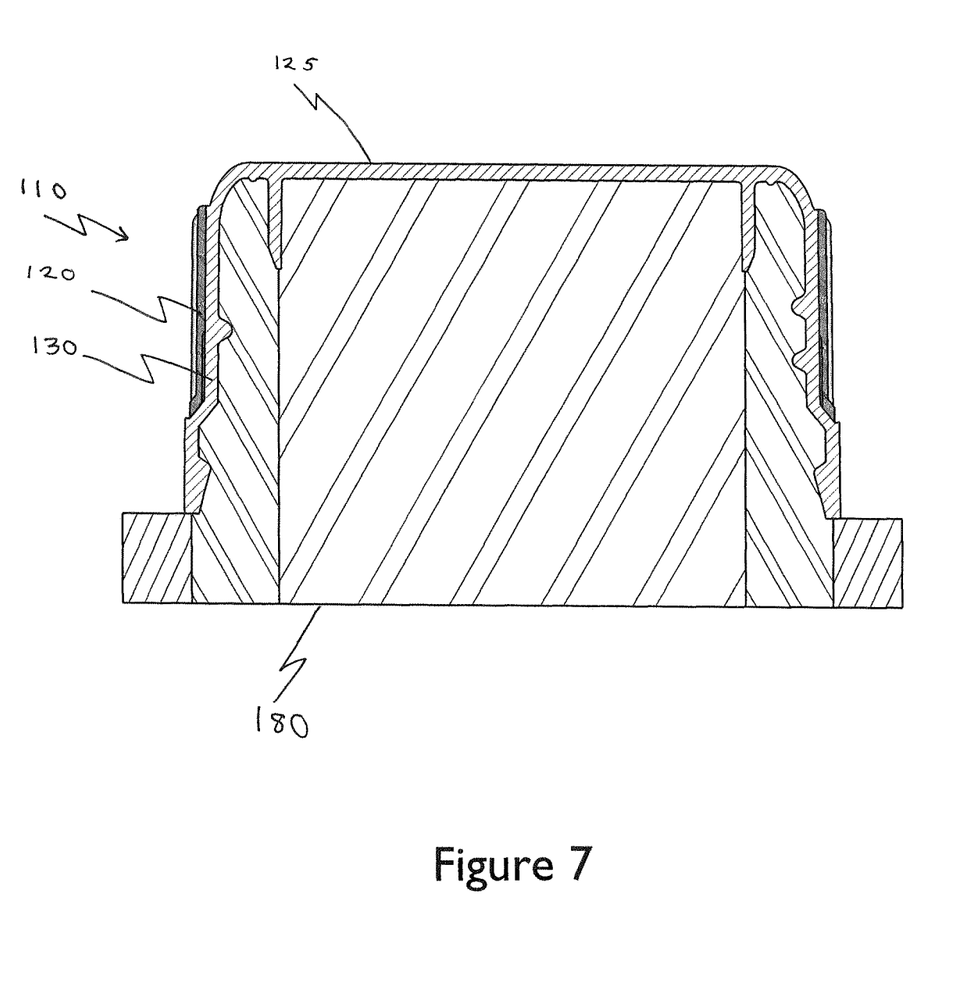
Figure 8:
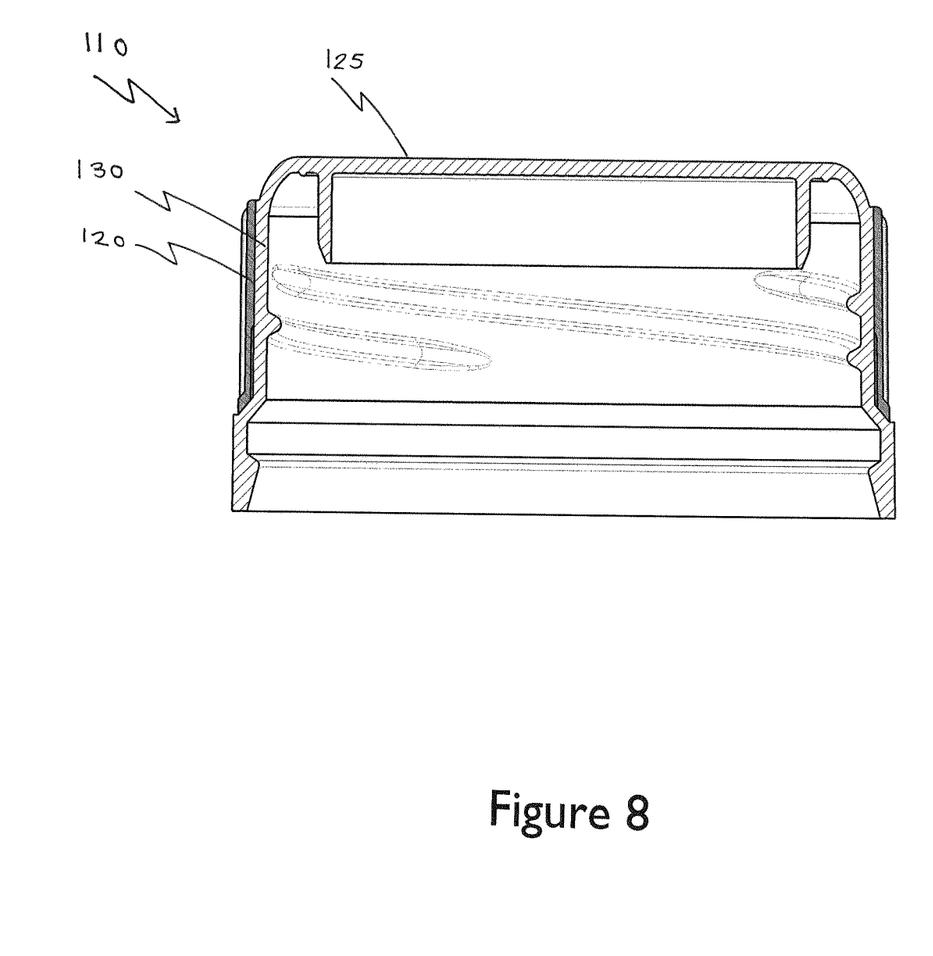

In FIG. 7 the mould is shown opened, with the mould part 185 withdrawn axially i.e. simple demoulding in the principal axis of the workpiece. The core 180 is then stripped to release the closure as shown in FIG. 8. The closure 110 is then ejected from the mould ready for use.

In this embodiment the closure 110 is post-mould processed to introduce slits to define frangible bridges and thus creates the tamper-evident band at the free end of the sidewall.

Figure 9:
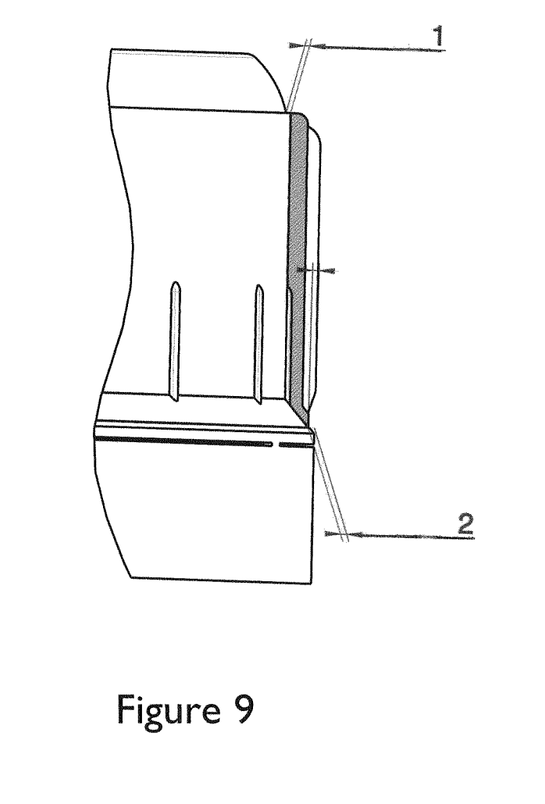
FIG. 9 shows part of a closure formed in accordance with the present invention.
Figure 9A:
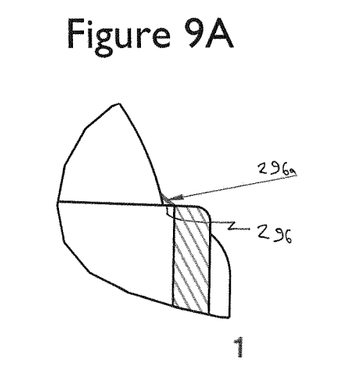
FIGS. 9A and 9B show magnified areas 1 and 2 of FIG. 9 respectively.
Figure 9B:
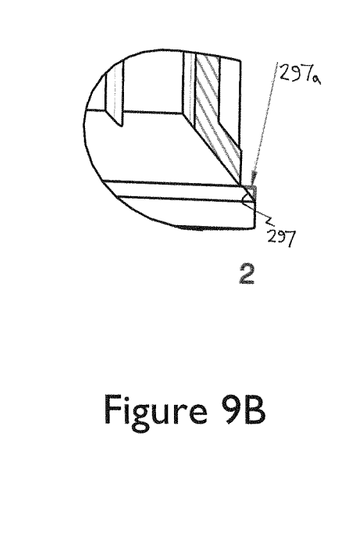

FIGS. 9, 9A and 9B show a magnified view of part of a closure 210 formed according to a further embodiment. In this embodiment the inner closure 215 has two support zones: support 1 is a flat radial step 296 located between the top plate and the sidewall, immediately adjacent one end of the ring; support 2 is an angled step 297 immediately adjacent the other end of the ring 220 and just above the point along the sidewall where frangible bridges 295 are formed. In other embodiments, for example, support 1 is an angled step 296a and support 2 is a flat step 297a, as also shown in the drawings. The zones give a good metal/plastic closure when the mould is closed and the mould part presses onto the supports.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention.

The invention claimed is:

1. A method of forming a bi-injected closure, comprising:
    forming an inner cap with a top plate and a depending cylindrical sidewall in a first injection moulding phase using a first mould part, the sidewall of the inner cap formed so as to include two external sealing support areas, the sealing support areas comprising radial steps which extend outwardly in a radial direction from the sidewall and which flank a portion of the sidewall onto which an outer ring is to be formed;
    changing the first mould part for a second mould part, and closing the second mould part onto the radial steps of the sealing support areas on the sidewall of the inner cap, such that the second mould part presses onto and seals against the two external sealing support areas so as to create a seal with the inner cap and delimit a cavity for the outer ring between the two external sealing support areas; and
    forming the outer ring around the sidewall of the inner cap whilst the second mould part is closed onto the sealing support areas in a second moulding phase, by injecting a material for the outer ring into the cavity for the outer ring.

2. A method as claimed in claim 1, in which each of the sealing support areas is generally flat.

3. A method as claimed in claim 1, in which each sealing support area has a width in the range of 0.1 mm to 0.3 mm.

4. A method as claimed in claim 1, in which the closure is demoulded along a main axis thereof after the second moulding phase.

5. A method as claimed in claim 1, in which in the first injection moulding phase the material is injected generally axially.

6. A method as claimed in claim 1, in which in the second moulding phase the material is injected generally laterally.

7. A method as claimed in claim 1, in which the first and second mould parts are portions of a mould, and part of the mould is rotated between the first injection moulding phase and the second moulding phase.

8. A method as claimed in claim 7, in which the inner cap carried on a core mould part is rotated.

9. A method as claimed in claim 8, in which the core mould part is rotated approximately 90 degrees.

10. A method as claimed in claim 1, in which the sidewall of the inner cap is formed so as to include one or more anti-rotation ribs on an exterior of the sidewall.

11. A method as claimed in claim 1, in which the outer ring is formed so as to include one or more ribs on an exterior of the outer ring.

12. A method as claimed in claim 1, in which the inner cap is formed from polyethylene.

13. A method as claimed in claim 1, in which the outer ring is formed from a thermoplastic elastomer material.

14. A method as claimed in claim 1, in which, at an end of the sidewall of the inner cap and opposite the top plate, an inclined wall section is provided and extends radially outwards.

15. A method as claimed in claim 14, in which, at the end of the inclined wall section, an axial wall section depends and defines the radial steps.

16. A method as claimed in claim 1, wherein the radial steps extend outwardly in a radial direction from an outer surface of the outer ring after forming the outer ring.

17. A method as claimed in claim 1, in which each of the sealing support areas is angled.

18. A method as claimed in claim 1, in which each of the sealing support areas is a chamfer.

19. A method as claimed in claim 1, in which each of the sealing support areas is a radius.

20. A method as claimed in claim 1, wherein the second mould part is partly supported by the two external sealing support areas after closing the second mould part onto the radial steps of the sealing support areas.

* * * * *